June 22, 1943.                H. L. STRUBE                 2,322,485
                                CONVEYER
                           Filed April 23, 1941          6 Sheets-Sheet 3

Inventor
Harry L. Strube
By L. Donald Myers
                                Attorney June 22, 1943.  H. L. STRUBE  2,322,485
CONVEYER
Filed April 23, 1941  6 Sheets-Sheet 4

Inventor
Harry L. Strube
By L. Donald Myers
Attorney

June 22, 1943.　　　H. L. STRUBE　　　2,322,485
CONVEYER
Filed April 23, 1941　　　6 Sheets-Sheet 6

Inventor
Harry L. Strube
By L. Donald Meyers
Attorney

Patented June 22, 1943

2,322,485

UNITED STATES PATENT OFFICE 2,322,485

CONVEYER

Harry Louis Strube, Philadelphia, Pa., assignor to Link-Belt Company, a corporation of Illinois Application April 23, 1941, Serial No. 389,975

14 Claims. (Cl. 198—168)

This invention relates to new and useful improvements in conveyers adapted to transport flowable solid materials in bulk.

During recent years more and more users of flight conveyers have come to realize the possibility of employing a single type of conveyer to move the different kinds of flowable solid materials handled in their plants through vertical, horizontal or inclined paths, as well as any desired combination of such paths which will include the bends or curves required to join the angularly arranged path portions. In other words, they were no longer required to employ scraper flight conveyers for moving the materials through either horizontal or slightly inclined paths; bucket elevators for moving the materials up vertical or steeply inclined paths, and combinations of these two different types of conveying devices, with suitable material transferring mechanism interposed between the same, for moving the materials through paths which consisted of both vertically and horizontally arranged portions. This ability to standardize on a single type of conveyer would materially simplify the problem of maintaining an adequate supply of conveyer replacement parts for a wide assortment of flights, conveyer chains, chain link attachment lugs, etc., no longer would be required.

This ability to standardize on one type of conveyer equipment is made possible by the development of flights which are capable of moving flowable solid materials in bulk through conveyer casings which enclose all sides of the flight paths through which the materials can escape, or be unintentionally discharged by gravitational flow. Conveyer flights, to be able to economically move lump, granular, or powdered materials in whatever directions a casing may lead must be capable of certain accomplishments, the principal ones of which briefly will be outlined as follows:

1. The flights must have the ability to move freely through enclosing casing legs or sections, which may extend horizontally, vertically, at an inclination to the horizontal, or around bends, without producing undue noise as a result of vibrating, chattering, or jumping.

2. They must be capable of receiving the proper amount of material while moving at a desired rate past a feed opening through which the casing is supplied with the material to be transported.

3. Adjacent flights must be capable of cooperating with each other, while passing through succeeding curved and straight casing portions, or when a reasonable amount of overloading of the intervening spaces occurs, to take care of the resultant expansion and wedging or squeezing actions on the material without developing excessive side pressure against the casing walls.

4. The flights must be capable of moving the materials through vertical or steeply inclined casing legs without developing excessive or uneven side pressure against the casing walls as a result of settling and packing of the material.

5. The flights should have the ability to move centrally through either horizontal or vertical casing legs; that is, with a minimum amount of transverse drift, so as to maintain uniform the desired clearance between the flight edges and the casing walls and thereby prevent excessive slip or leakage past the flights.

6. The movement of loaded flights around bends or curves should not have the effect of materially increasing or decreasing the clearance between the outer edges of the flights and the casing wall forming the outer sides of the bands.

7. The flights should be able to completely empty their load while passing through a horizontal casing portion in which the bottom casing wall has been omitted to effect discharge of the material or to bring about transfer of the material between upper and lower runs of the conveyer.

8. When the material is to be discharged through an opening formed in a vertical wall of the head casing section of an L-type conveyer-elevator, a loop-boot type elevator, or the like, the flights should be capable of completely spilling their charges either as a result of withdrawal of the lateral support afforded by the casing, or due to the travel of the flights around the uphill quarter section of the head wheel so that no material will be carried over to and down the return leg of the casing.

9. At least a certain number of the flights of each conveyer assembly should be capable of functioning to clean out all portions of the casing after feeding of the material has stopped.

With all of the above requirements in mind, the primary purposes of this invention are to provide solid flights, for conveyers adapted to handle flowable materials, which are so constructed, arranged and operated as to be capable of moving freely and without unreasonable noise through a casing extending in any desired direction; of receiving the materials to be conveyed without overloading or underloading the spaces between flights; of transporting the materials through all parts of the casings without developing excessive or uneven side pressures against any of the casing walls; of automatically maintaining a substantially uniform clearance between the flight edges and the walls of all casing leg portions; of completely spilling the conveyed materials, when desired, either while moving through horizontal casing legs or while passing through the discharge chambers of head casing sections; and, of cleaning out all portions of the casings after feeding of the material has stopped.

An important specific object is to provide solid flights which have their material moving surfaces so shaped, and so arranged relative to their path of travel and the cooperating conveyer casing portions, as to be capable of accomplishing the above noted primary purposes of the invention.

Other objects and advantages of the invention will be apparent during the course of the following description.

In the accompanying drawings forming a part of this specification and in which like numerals are employed to designate like parts throughout the same.

Figure 1:
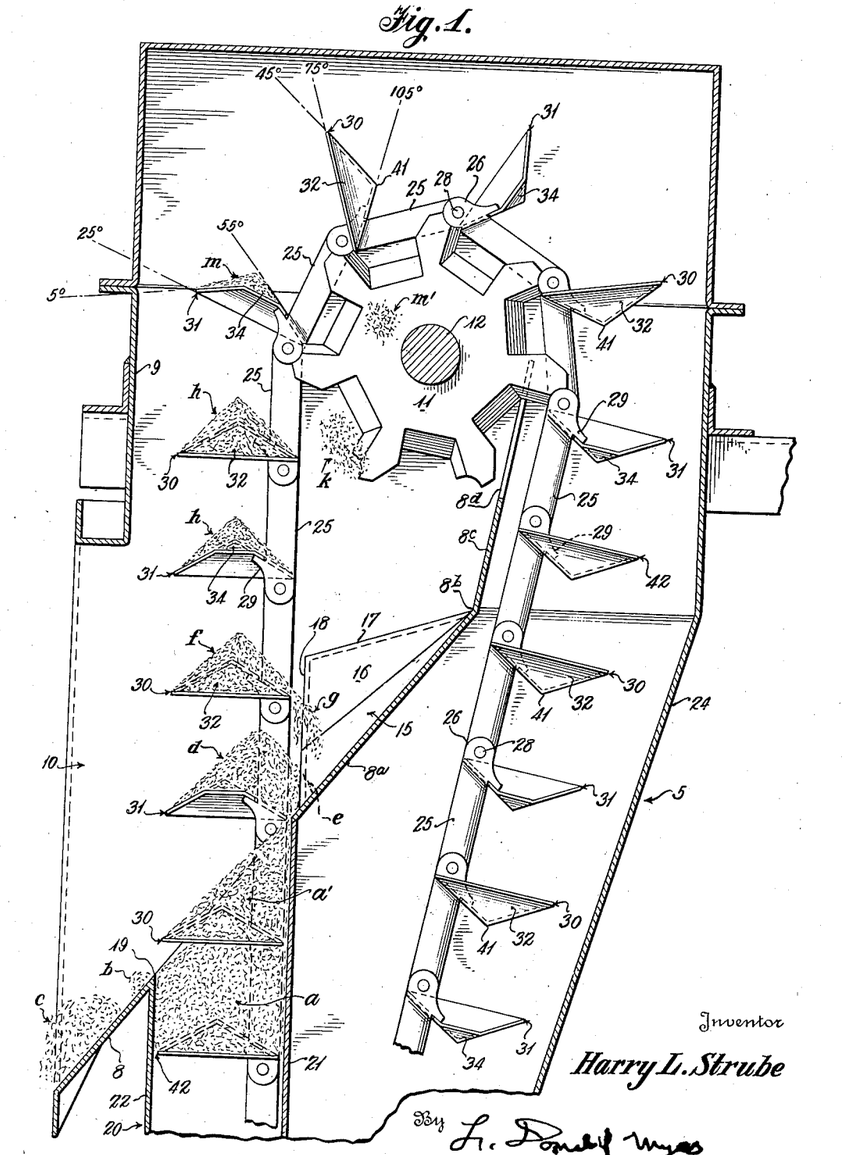
Figure 1 is a vertical sectional view of the head section of a conveyer casing with material transporting mechanism embodying this invention illustrated therein, including a plurality of forms of material transporting flights.
Figure 2:
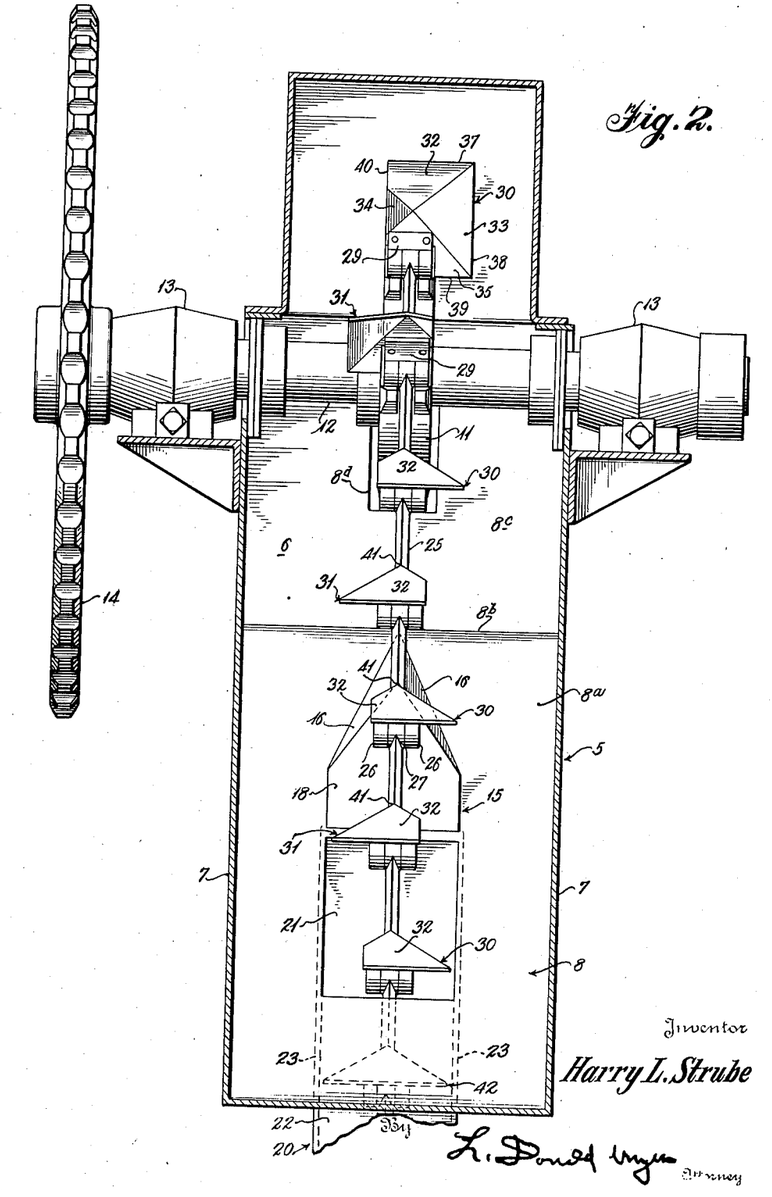
Figure 2 is a vertical sectional view of the conveyer structure shown in Fig. 1 but taken at right angles to this latter figure.

In the drawings, wherein for the purpose of illustration are shown the preferred and other embodiments of this invention, and first particularly referring to Figs. 1 and 2, the reference character 5 designates in its entirety the head section of a casing of a conveyer which, for example, may be of the L-type conveyer elevator or of the loop-boot type elevator. This casing head section will not be described in detail because it is fully disclosed and claimed in the patent to Ferdinand F. Waechter, No. 2,235,856, issued March 25, 1941.

Insofar as the present invention is concerned, this casing head section includes a discharge chamber 6 which is formed by the side walls 7, the sloping discharge chute 8 and the outer or front wall 9. This front wall 9 is provided with a discharge opening 10 through which all of the material transported by the conveyer is discharged.

The discharge chute 8 consists of the main body portion 8a extending from the lower marginal edge of the discharge opening 10 at an inclination which is preferably steeper than 45° to the line 8b where it joins with a second chute portion 8c. This chute extension 8c is slotted at 8d to accommodate the peripheral teeth of the head wheel 11 that is carried by the drive shaft 12 journaled in the outboard bearings 13 of the head casing section. A suitable drive element 14 is mounted on one end of the shaft 12.

It will be seen from the disclosures of Figs. 1 and 2 that the inner portion of the main body part 8a of the discharge chute 8 extends inwardly as well as upwardly so as to underlie the drive shaft 12 and a portion of the head wheel 11. The chute extension 8c is inclined to a greater angle than the main body portion 8a and extends above the bottom of the head wheel and to each side of the latter.

A flow splitting wedge 15 is formed as a part of or is attached to the upper portion of the main body part 8a of the discharge chute. This flow splitting wedge functions to divide and spread laterally any material which is discharged over the inner edges of flights as they pass around the uphill quarter section of the head wheel 11. To accomplish this lateral splitting and spreading of the inwardly discharged material, the flow splitting wedge is formed with laterally sloping top surface portions 16 which meet in a ridge line 17. A front wall 18 is formed as a part of the flow splitting wedge.

The wedge 15 spreads the rearwardly or inwardly discharged material laterally so that it will pass down the side portions of the discharge chute 8 around the outlet end 19 of the vertical casing leg 20 through which the conveyed material is raised to be emptied into the discharge chamber 6. This active casing leg is illustrated in Figs. 1 and 2 and in other figures to be referred to at later points. It will be seen from the several figures that the casing leg is of square formation in transverse section. It will be understood, however, that casing legs of rectangular section, having unequal sides, may be employed when desired. This change in sectional shape of the casing legs will in no way modify the operation of or the results accomplished by the several forms of flights which will be described in detail as the disclosure of this invention proceeds.

The vertical casing leg 20 includes a rear wall 21, a front wall 22, and the side walls 23. As the vertical casing leg 20 terminates at the plane of the inclined chute portion 8a, the upper end of the casing leg 20 is shaped so that the top edge of the inner or rear wall 21 extends above the top edge of the outer or front wall 22 while the top edges of the two side walls 23 are inclined.

The inactive or return path of the material transporting mechanism is defined by the rear wall 24 of the casing head section 5, the two side walls 7 and the portions 8a and 8c of the discharge chute as well as the rear wall 21 of the active casing leg 20.

The first type of material transporting mechanism to be described in detail is disclosed in Figs. 1 to 6 inclusive. This mechanism includes a transmission chain which is made up of the several articulated links 25. Fig. 2 discloses the trailing end of each one of these links as including the spaced ears 26 which are adapted to receive between the same the single ear 27 of the leading end of the next succeeding link. A suitable chain pin 28 is employed to complete each chain joint. Figs. 1 to 4 inclusive disclose the trailing end of each link as being provided with an attachment lug 29. These lugs are employed for securing the material moving flights rigidly to their respective chain links. It will be noted from an inspection of Fig. 1 that these attachment lugs extend at an inclination to the direction of travel of the conveyer chain, or at an acute angle to the longitudinal axis of the carrying link. It will be noted by inspecting Figs. 1 and 2 that the attachment links for all of the flights are of the same shape notwithstanding the fact that three different shaped flights are employed. In other words, each one of the attachment lugs will accommodate each different shape of flight. This feature materially simplifies the problem of assembling the links into a complete chain.

Figure 3:
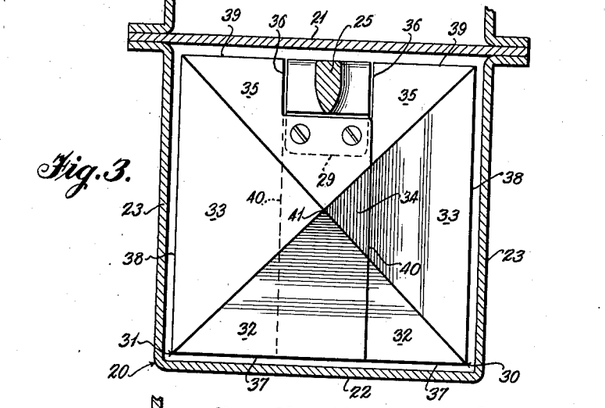
Figure 3 is a horizontal sectional view taken through the casing of Figs. 1 and 2 and illustrating one form of material transporting flight disclosed therein.

The transmission mechanism or chain of Figs. 1 to 4 inclusive has attached thereto a suitable number of material transporting, solid or closed flights, all of which are of pyramidal form. These solid or closed flights are capable of moving solid flowable material in bulk when the transporting mechanism is confined within a casing leg so that the material will not be permitted to flow away from the flights. These flights of pyramidal form are not all of identical shape or construction. They are divisible into what will be termed half flights and full flights. The so-called half flights, additionally, are divisible into right hand flights and left hand flights. These half flights are only intended to occupy a part of the cross sectional area of an active casing leg. As these right and left hand half flights are intended to overlap in the direction of travel of the material transporting mechanism, and as they are intended to approach within a given distance of the right and left side walls 23 respectively, each one of these flights preferably will occupy slightly more than one-half the cross sectional area of a casing leg. Fig. 3 discloses in plan one right hand and one left hand half flight. The overlap of these two flights is disclosed in this figure as corresponding to the width of an attachment lug 29. With the half flights overlapping in this manner, they can be securely fastened to their respective attachment lugs. The transmission chain is disclosed in Figs. 1, 3 and 4 as following a path that lies closely adjacent the inner or rear wall 21 of the casing leg 20. Adjacent half flights are disclosed in Fig. 3 as collectively substantially filling the cross sectional area of a casing leg.

It will be appreciated that these half flights may overlap to a greater or lesser extent if desired and a greater or lesser clearance may be provided between the outer marginal edges and the casing leg walls with which these edges cooperate. The amount of clearance should be such as to permit any particle or lump which may become wedged between a flight edge and a casing leg wall to free itself and slip rearwardly as a result of transverse movement of the flight relative to the casing leg.

Figures 4, 5, 6:
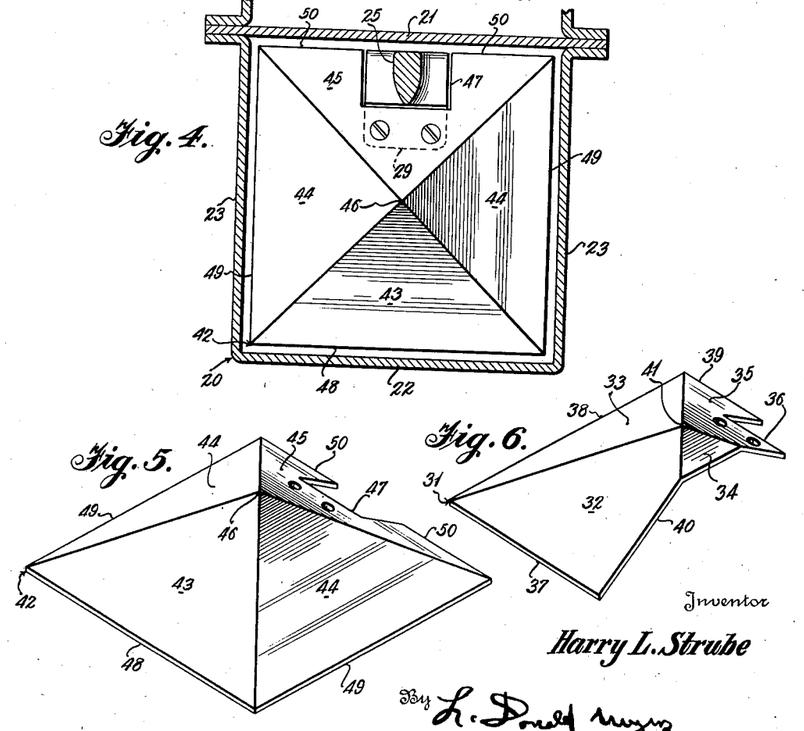
Figure 4 is a similar view to Fig. 3 but taken at a different horizontal plane, and showing a different form of flight.
Figure 5 is a detail perspective view illustrating the type of flight disclosed in Fig. 4.
Figure 6 is a detail perspective view illustrating the type of flight disclosed in Fig. 3.

These right and left hand half flights 30 and 31 respectively will be described in detail in connection with the disclosures of Figs. 3 and 6. It will be appreciated that these half flights are shaped alike except that they are opposites with respect to each other. Each flight is hollow in that it has an interior surface and an exterior surface. The exterior surface is employed for moving or pushing the material through a casing leg. Each one of these half flights has its exterior material moving surface divided into a front surface area 32, a full side surface area 33, a partial side surface area 34, and a rear surface area 35. The rear surface area is notched or cut away at 36 to accommodate the chain link 25 to which the flight is attached.

Each front surface area 32 is provided with an outer marginal edge 37 while the side surface area 33 is provided with an outer marginal edge 38 and the rear surface area 35 is provided with a marginal edge 39. The fourth side of each one of these half flights is provided with a composite edge 40. This edge is formed by one margin of the front surface area 32, the outer margin of the partial side surface area 34, and one margin of the rear surface area 35. When viewed in plan, it will be noted that each one of these half flights has its adjacent edges arranged in planes which are normal to each other; i. e., the edges 37, 38, 39 and 40 are arranged in planes which are parallel to the front, side, rear and side casing leg walls 22, 23, 21 and 23 respectively. By inspecting Figs. 1 and 2, it will be seen that the edges 37, 38 and 39 also occupy a common plane which is normal to the several casing leg walls or the axis of the transmission chain. The remaining, composite edge 40 is arched with respect to the common plane occupied by the edges 37, 38 and 39.

It will be seen by inspecting Figs. 1 and 2 that these various exterior material moving surface areas 32 to 35 inclusive are all inclined, or arranged at an acute angle, with respect to any plane which is normal to the various walls of the casing leg. These various surface areas all meet at a vertex 41 which is spaced from the axis of the associated chain link. By inspecting Figs. 1 to 3 inclusive, it will be seen that the vertexes of all of these half flights are aligned in the direction of travel of the material transporting mechanism and the longitudinal axis of the casing leg will pass through the vertexes 41 when the transporting mechanism is centered with respect to the casing leg.

Due to the direction of inclination of the several surface areas 32 to 35 inclusive, material will be spilled therefrom their outer edges 37 to 40 respectively toward all four walls 21 to 23 of the casing leg. Of course, these surface areas will not actually spill material over their outer marginal edges as long as the flights are confined within a casing leg but this spilling of material in the four different directions will occur when the lateral support afforded by the casing leg walls is withdrawn.

Due to the fact that the casing leg 20 is disclosed as being of square formation in transverse section, the angle of inclination of the several surface areas 32 to 35 inclusive will be the same. It will be appreciated, however, that if the casing leg is of rectangular formation in transverse section that has unequal sides, the angle of inclination of the front and rear surface areas 32 and 35 respectively will be different than the angle of inclination of the side surface areas 33 and 34. Of course, the angle of inclination of these various surface areas may be of any desired value. To permit the discharge of material from the exterior material moving surfaces of the half flight to be fully disclosed and described, the inclination of the surface areas has been illustrated in Figs. 1 and 2 as being 30° and the material being conveyed is assumed to have an angle of repose of 45°.

As it is the function of the several inclined surface areas 32 to 35 inclusive to completely spill or discharge all of the transported material into the discharge chamber 6 of the casing head section 5 so that no material will be carried over the head wheel and down the return casing leg, the angle of inclination of the surface areas should bear the proper relationship to the angle of repose of the transported material to accomplish this desired result. Of course, if the angle of repose of the transported material is flatter than the angle of inclination of the surface areas of the flights, the material will be completely spilled from the exterior material moving surfaces of the flights as a result of the flights passing into the discharge chamber 6. However, if the angle of repose of the material is steeper than the angle of inclination of the surface areas of the flights, some material will remain on the flights and this retained material must be discharged from the flights during passage of the latter around the uphill quarter section of the head wheel 11 or material will be carried over to the return leg of the casing. In describing the discharge of material in connection with the disclosure of Fig. 1, it will be explained how the coaction between the chain links and the teeth of the head wheel, as well as the manner of attaching the flights to the attachment lugs of the respective links function to effect complete discharge of all material remaining on these flights after they have completely moved into the discharge chamber.

It is to be understood that the use of nothing but these staggered right hand and left hand flights throughout the entire length of the transmission chain falls within the concept of this invention and that under certain operating conditions, and in handling certain types of materials, nothing but these half flights need be provided. Under other operating conditions, and in handling other types of materials, it is believed to be advisable to employ full flights at certain of the pitches of the chain. The number of full flights employed may be varied to take care of the different operating conditions. In Fig. 1, two of these full flights 42 are disclosed. One full flight is disclosed in each of Figs. 2, 4 and 5.

These full flights are attached to the lugs of their respective chain links so as to extend to the front, or to one side only, of the path of travel of the conveyer chain. These full flights are intended to fully occupy the cross sectional area of a casing leg with, of course, the proper amount of clearance left between each of its four angularly arranged outer marginal edges and the cooperating walls of the casing leg to take care of the different types of materials to be handled by different conveyers.

The construction of a full flight will be described in connection with the detail disclosures of Figs. 4 and 5. These full flights, also, are of hollow construction in that they are formed with interior and exterior surfaces. The exterior surfaces are employed for transporting or moving the material. The exterior material moving surface is made up of a front surface area 43, the two opposite side surface areas 44, and the rear surface area 45. Due to the fact that these full flights 42 are of pyramidal form, the various surface areas 43 to 45 inclusive are inclined and meet at a vertex 46. The vertexes of full flights are intended to be axially aligned with the vertexes 41 of half flights, as is clearly illustrated in Figs. 1 and 2. The rear surface area 45 is notched or cut away at 47 to accommodate the associated portion of a chain link.

The surface area 43 is provided with a front or outer marginal edge portion 48 while the opposite side surface area 44 are provided with outer side marginal edges 49. The rear surface area is provided with a rear marginal edge 50 which is really divided into two portions by the chain link receiving notch or cut away portion 47. These inclined surface areas 43 to 45 inclusive are intended to spill material over their respective outer marginal edges when the lateral support afforded by side walls of a casing leg is withdrawn. If the angle of repose of the material moved by a full flight is less or flatter than the angle of inclination of the respective surface areas of a full flight, all of the material will be spilled over the edges of the flights when the lateral support is withdrawn. Some material will remain on the exterior surface of the full flight if the angle of repose of the material is steeper than the angle of inclination of the surface areas. It will be appreciated, therefore, that the four different surface areas of a full flight will spill material in four different directions, or in the directions of the four walls of a casing leg as such a full flight passes into the discharge chamber of a casing head section.

These full flights 42 may be employed for performing either one or both of two functions. When handling certain types of materials, the half flights are entirely satisfactory for quickly performing the operation of completely emptying or cleaning out the active vertical casing leg of a conveyer casing after feeding of material to the conveyer has been stopped. Under such conditions, full flights are not required for accomplishing this emptying or cleaning out operation. However, when very free flowing material is being transported, the half flights are not entirely satisfactory for quickly performing the cleaning out operation and under such conditions a suitable number of full flights 42 may be employed. Therefore, one function to be performed by full flights is this cleaning out operation.

It will be appreciated that throughout the entire section or portion of a chain which is provided with nothing but half flights, a continuous, zigzag space is provided for the conveyed material. That is to say, on each side of the conveyer chain, a series of chambers is provided for receiving the material and each one of these chambers extends between either two right hand flights or two left hand flights. Each one of these spaces represents two chain pitches in length. They are laterally connected at their opposite ends with the next adjacent spaces through the areas of overlap of adjacent right and left hand flights. Therefore, to the extent to which adjacent right and left hand flights overlap in the direction of travel of the chain, the spaces formed between adjacent flights are only one pitch in length.

In handling certain materials which settle and pack to a considerable extent when being conveyed through a vertically extending leg of a casing, it has been found to be desirable to break up or interrupt the continuity of the continuous, zigzag material conveying space provided by a stretch of half flights by employing a certain number of suitably spaced full flights. These full flights, when employed in this manner and for this purpose, may be spaced any desired number of pitches found to be most desirable. Due to the fact that each full flight substantially entirely fills the cross sectional area of a casing leg, the "head" of material above a full flight will not be delivered to the material located rearwardly of such a flight. Therefore, full flights may be employed for performing this second function of definitely dividing the material "head" into distinct sections or parts.

As was stated above, the disclosure of Fig. 1 will be employed in explaining the manner in which these flights of pyramidal form function to effect complete discharge of the conveyed material between the time the flights emerge from the upper end of the active casing leg 20 and the time the flights reach the top dead center of the head wheel 11. Starting with the full flight 42 which is disclosed as still being entirely located within the casing leg 20, it will be seen that the entire space between adjacent flights will be filled with the material $a$. Preceding this full flight 42 is a right hand half flight 30. This latter flight has just started to emerge from the upper end of the casing leg 20. Its front edge 37 has cleared the upper edge of the front wall 22 of the casing leg and the material $a$, in the space between the full flight 42 and the half flight 30, is being discharged, as indicated at $b$.

Between the exterior material moving surface of the emerging right hand half flight 30, the rear wall 21 and the side wall 23 of the casing leg 20 material $a'$ is still trapped or held. The balance of the material which occupied the chamber or space formed between this emerging right hand flight 30 and the preceding left half flight 31 has been discharged and is flowing down the chute 8, as indicated at $c$. As the emerging right hand half flight 30 moves into the discharge chamber 6, more of the material $a'$ will be discharged by gravity onto the discharge chute.

The left hand half flight 31, which has entirely emerged from the casing leg 20, is no longer provided with any lateral support by any of the casing leg walls. Therefore, it has spilled all of the material which will be discharged over its front edge 37 and its side edges 38 and 40. This half flight 31, however, is still cooperating with the front face 18 of the flow splitting wedge 7 so that material $d$ is still held by the flight. Some of this material $d$ is discharging in a rearward direction, as at $e$, from this left hand flight 31 because the front face 18 of the flow splitting wedge is slightly, rearwardly offset with respect to the rear edge 39 of the flight. Of course, the front face 18 of the flow splitting wedge can be arranged so that it will be in perfect vertical alignment with the rear wall 21 of the casing leg 20 and this slight discharge $e$ then will not occur.

Preceding the completely emerged left hand half flight 31 is a right hand half flight 30. This flight 30 has moved vertically to a sufficient extent to cause it to start traversing the converging top portion of the flow splitting wedge 17. The rear support afforded by the front face 18 of this wedge, therefore, is gradually being withdrawn and some of the material $f$ supported by the half flight 30 is discharging rearwardly, as at $g$. This rearwardly discharged material $g$ is spread laterally by the sloping top surface 16 of the flow splitting wedge and is delivered to the proper side portion of the chute part 8a. It will be recognized that this right hand half flight 30 will spill all of its material $g$ onto the right hand sloping top surface 16 of the flow splitting wedge because this right hand flight will not support any material to the left of the transmission chain. A left hand half flight, in moving upwardly of the converging top portion of the flow splitting wedge will discharge its material $g$ onto the left hand sloping top surface 16 of the wedge.

One left hand half flight 31 and a right hand half flight 30 are illustrated in this Fig. 1 as having moved entirely above the flow splitting wedge 17. These two flights have material $h$ still resting thereon. As the designated angle of inclination of the surface areas of these two flights is 30° and the angle of repose of the conveyed material is considered to be 45°, the top surfaces of the material $h$ have all been trimmed down to the 45° angle. The base of the material $h$, of course, is defined by the edges 37, 38, 39 and 40 of the half flight supporting the same. The pyramidal form of each one of these half flights, of course, defines the shape of the bottom of each pile or body of material $h$. It will be appreciated, therefore, that very little material in fact still remains on these two flights which are traveling vertically through the discharge chamber 6.

The leading transmission chain joint for the right hand half flight 30, which is carrying material $h$, has been picked up by a tooth of the head wheel 11. As the head wheel continues to rotate, this chain joint will start traveling around the uphill quarter section of the wheel periphery. The next preceding chain link 25 has been picked up by two teeth of the head wheel and, of course, has assumed a chordal position with respect to the wheel. This angular arrangement of the first fully meshed chain link 25 has caused all surface portions of the rigidly attached left hand half flight 31 to change their angular positions with respect to the horizontal. For example, the plane commonly occupied by the edges 37, 38 and 39 has assumed an angle of 25°. The front surface area 32 of this flight has been reduced from a 30° angle to a 5° angle. The side surface areas 33 and 34 still have normal angles of inclination but they have assumed a new angle with respect to the horizontal which corresponds with the angle occupied by the aforesaid common plane occupied by the marginal edges 37, 38 and 39. The rear surface area 35 has now assumed a 55° angle with respect to the horizontal. Therefore, an additional batch of material $k$ has been discharged from the flight to leave only the very small amount of material $m$ still resting on the flight. It will be appreciated that the rear surface area 35 will no longer support any of the material. The surface areas 32, 33 and 34 still support some material but the same has been trimmed off to a 55° angle at the back and, of course, a 45° angle at the front and at each side.

The next preceding flight, a right hand half flight 39, has advanced to a point where its side surface areas 33 and 34 have assumed an angle of 75° and its front surface area 32 has assumed an angle of 45°. All of the remaining material $f$, therefore, has been discharged as $m'$. This final discharge has occurred prior to arrival of the right hand half flight 30 at the top dead center of the head wheel 11. Therefore, no material will be carried beyond this top dead center and discharged down the return run or leg of the conveyer casing.

No attempt has been made to illustrate the manner in which a full flight 42 will discharge its material. It will be understood, however, that a full flight will not discharge as much material $c$ but will discharge a proportionately greater amount of material at $e$, $g$, $k$ and $m'$ so that all of the material will be completely discharged by the time the flight has reached the position of the right hand half flight 30 from which the $m'$ material has been discharged. This difference in the amount of discharge of the material at the various stages is due, of course, to the difference in supporting area afforded by half flights and full flights.

Although no chain assembly has been disclosed which has full flights 42 attached to all of the chain links; i. e., with no half flights included in the assembly, it is to be understood that such an arrangement falls within the concept of this invention.

The remaining figures of the drawings disclose modified forms of flights. These additional illustrations do not include disclosures of the casing head section shown in Figs. 1 and 2. It is to be understood, however, that all of these modified flights are to be used in place of the material transporting mechanism actually shown in Figs. 1 and 2 when a conveyer employing these modifications is assembled and claims which refer to these casing head section elements which are not disclosed in Figs. 7 to 16, inclusive, are intended to apply to complete conveyer assemblies including the forms of flights shown in Figs. 7 to 16, inclusive, if the remaining limitations of the claims will permit.

Figs. 7 to 12 inclusive disclose an assembly of half and full conoidal flights which constitutes a modification of the assembly illustrated in Figs. 1 to 6 inclusive only insofar as the shapes of the half and full flights are concerned. These conoidal flights will function, for all practical purposes, in the same manner as the pyramidal flights notwithstanding the fact that the exterior material moving surfaces of the conoidal flights are not divided into definitely distinguishable surface areas by radiating fold or bend lines, as is the case with the pyramidal flights. As the shapes of these conoidal flights is the only thing that distinguishes them from the pyramidal flights, their shape or characteristics will be all that will be covered by the specific or detail description.

Figs. 7 to 10 inclusive disclose this material transporting mechanism passing through a casing leg section 20 which includes the front wall 22, the rear wall 21 and the two side walls 23. A transmission chain made up of links 25 passes through the casing leg along a path which lies closely adjacent the rear wall 21. Each one of these chain links 25 is provided with a flight attachment lug 51 which differs from the attachment lugs 29 of Figs. 1 to 4 inclusive only by having curved top surfaces instead of relatively flat top surfaces.

This assembly is made up of a suitable number of right hand half flights 52, a suitable number of left hand half flights 53, and a suitable number of full flights 54. The right and left hand half flights are alternately arranged and are overlapped in the direction of travel of the assembly to any extent desired but preferably to the extent specifically referred to in connection with the pyramidal form of flights. A full flight 54 may be provided at any desired number of pitches throughout the complete assembly or a complete assembly of full flights may be provided if desired.

Figure 9:
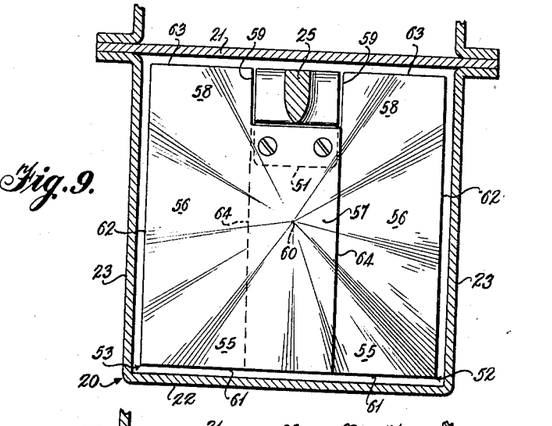
Figure 9 is a horizontal sectional view taken through the mechanism of Figs. 7 and 8 and illustrates one form of flight disclosed in these latter figures.

Each one of the half flights is of hollow construction in that it is formed with an interior surface and an exterior surface. The exterior surfaces are employed for moving the conveyed material. By specifically referring to Figs. 9 and 12, it will be seen that each half flight is provided with a front surface area 55, a side surface area 56, a partial side surface area 57 and a rear surface area 58. As was pointed out above, these respective surface areas are not sharply defined or distinguished from each other in the same manner as are the surface areas of the pyramidal flights but they do exist and function as such. Each rear surface area 58 is notched or cut away at 59 to accommodate the associated portion of its chain link. These various surface areas meet in a vertex 60 and the vertexes of all of the half flights are aligned in the direction of travel of the material transporting mechanism. Fig. 9 shows that the vertexes 60 coincide with the axis of the casing leg 20 and, for that reason, are spaced from the axis of their respective chain links 25.

Figures 10, 11, 12:
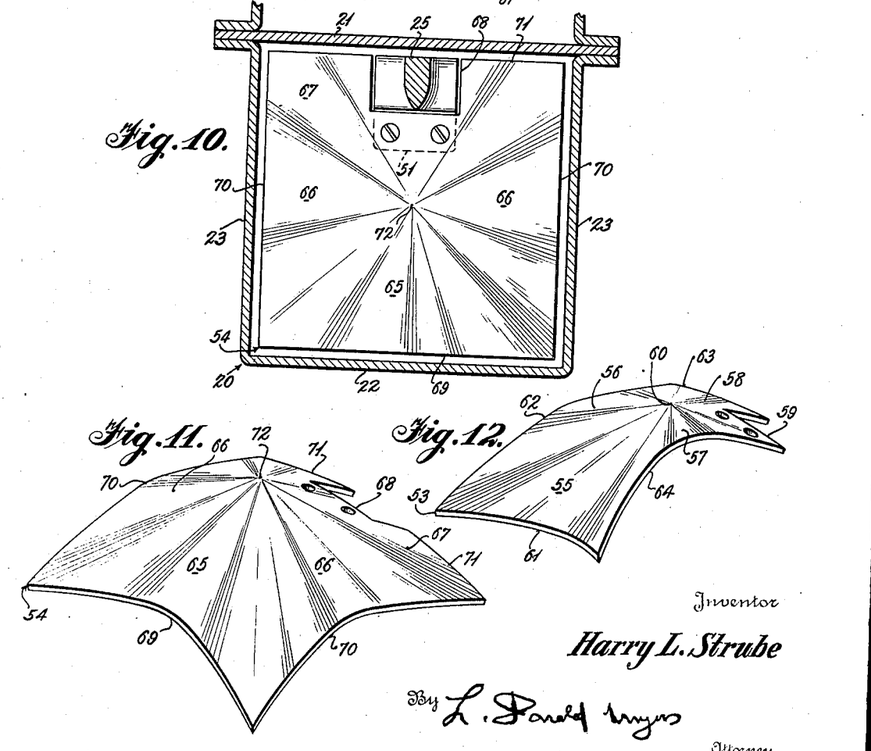
Figure 10 is a similar view to Fig. 9 but discloses the second form of flight illustrated in Figs. 7 and 8.
Figure 11 is a detail perspective view of the flight disclosed in Fig. 10.
Figure 12 is a detail perspective view of the type of flight disclosed in Fig. 9.
Figure 13:
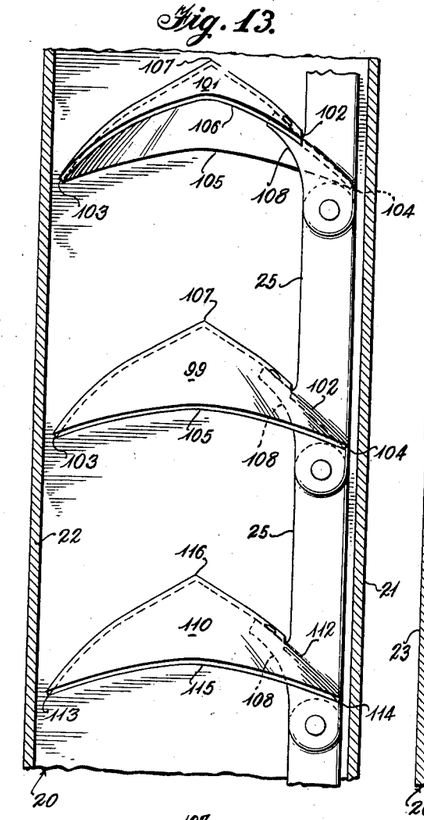
Figure 13 is a detail view, partly in vertical section and partly in side elevation, of material transporting mechanism which involves a type of flight that is a slight modification of the flight construction shown in Figs. 7 to 12 inclusive.
Figure 14:
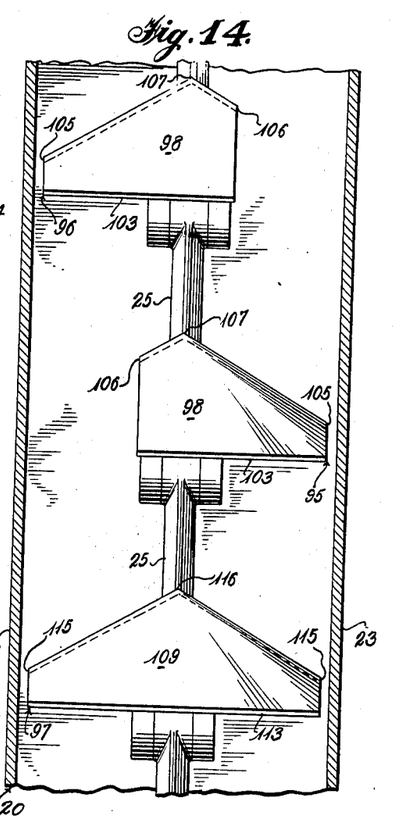
Figure 14 is a similar view to Fig. 13 but taken at right angles thereto.

The front surface area 55 of each half flight is provided with a front marginal edge 61 while the side surface area 56 is provided with a marginal edge 62. The rear surface area 58 is provided with a marginal edge 63. A composite marginal edge 64 is formed in part by the front surface area 55, the partial side surface area 57, and the rear surface area 58. To permit these half flights to be of rectangular formation when viewed in plan, or so that the marginal edges 61, 62, 63 and 64 will occupy right angularly arranged planes which are parallel with the various walls of a casing leg, the marginal edges are necessarily bowed or arched.

An angle of inclination of 30° has been adopted for the various surface areas of these half flights. Because the casing leg section 20 is of square formation in transverse section, all portions of the surface areas are inclined at the same angle. This, of course, would not be the case if the casing leg section were of rectangular formation in transverse section with unequal sides.

The construction of a full flight 54 will be described in detail in connection with Figs. 10 and 11. This full flight is provided with an exterior material moving surface because it is of hollow construction. The exterior material moving surface consists of a front surface area 65, two side surface areas 66 and a rear surface area 67. The rear surface area is notched or cut away at 68 to accommodate a chain link. The front surface area is provided with a curved or arched marginal edge 69. The two side surface areas 66 are provided with curved or arched marginal edges 70. The rear surface area is provided with a marginal edge 71 which is interrupted by the notch 68. The various surface areas 65 to 67 inclusive meet at a vertex 72 which is aligned with the vertexes 60 of the half flights in a complete assembly.

Figure 7:
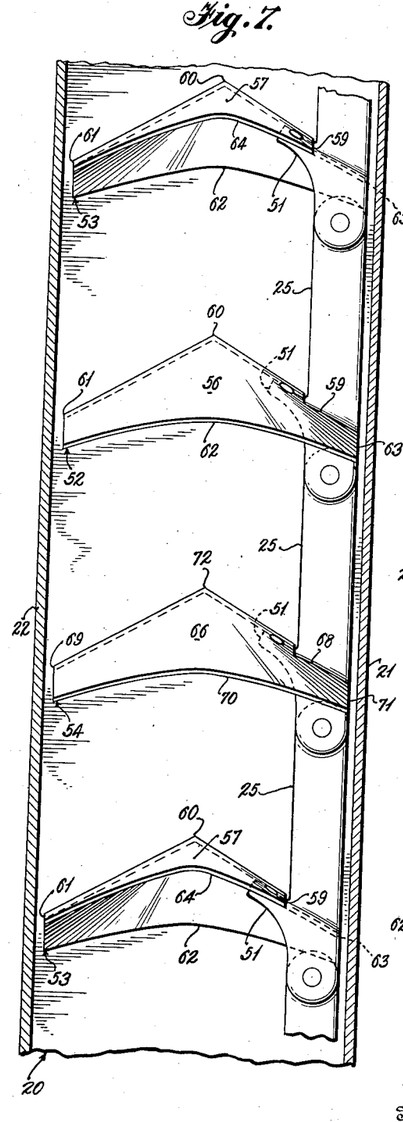
Figure 7 is a detail view, partly in vertical section and partly in side elevation, of material transporting mechanism of the type disclosed in Figs. 1 and 2 but including modifications in the flight members.
Figure 8:
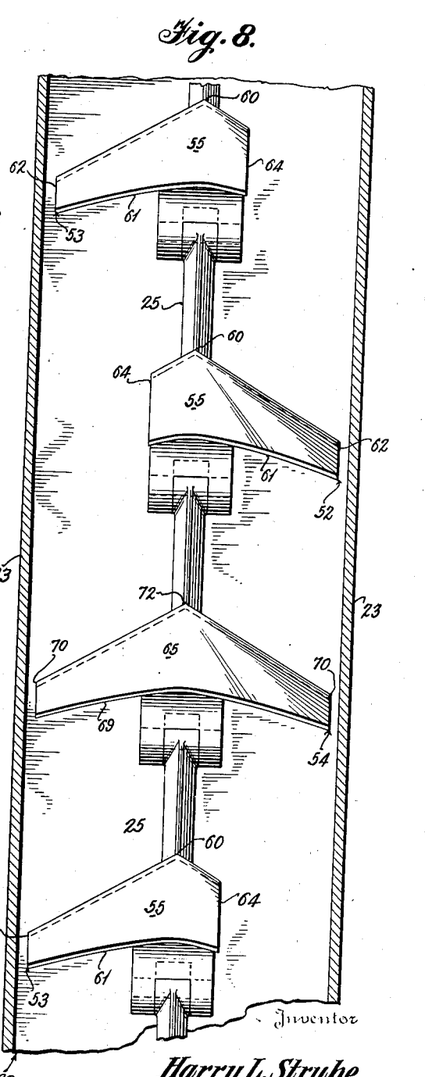
Figure 8 is a similar view to Fig. 7 but taken at right angles thereto.

It will be seen from inspecting Figs. 7 and 8 that all portions of each one of the conoidal flights 52, 53 and 54 are located in advance of the axis of articulation of the trailing chain joint of their respective links. Due to this fact and the fact that the various surface areas are inclined in the same general way as the surface areas of the half and full pyramidal flights, these conoidal flights will discharge material in exactly the same manner as the pyramidal flights. For that reason, no detail description of the discharge of material need be given for these conoidal flights.

It will be noted in the disclosures of Figs. 1 to 6 inclusive that the pyramidal half and full flights are provided with front and rear marginal edges which occupy planes that are normal to the front and rear walls 22 and 21 respectively of a casing leg. Because of this arrangement of the front and rear flight edges and because of the fact that these edges are positioned just slightly in advance of the joint axes of the trailing ends of the respective chain links, the flights are capable of traveling through bent or curved casing portions without materially increasing or decreasing the clearances between these edges of the flights and the associated, curved casing walls.

The front and rear edges of the conoidal flights, shown in Figs. 7 to 12 inclusive do not occupy planes which are normal to the front and rear casing leg walls. These front and rear flight marginal edges are bowed or curved in the direction of travel of the flights and for that reason the two front points of the full flights and the outer front point of the respective half flights trail all other portions of the front marginal edges. The same is true with the corner points for the rear margins of the flights. As these corner points must clear the front and rear walls of curved casing portions, an appreciable increase in clearance will be provided between the intermediate portions of the front and rear flight edges and the intermediate portions of the front and rear casing leg walls. The remaining Figs. numbered 13 to 16 inclusive disclose flight modifications which relate to the previously described conoidal flights. These modifications are produced by warping the front and rear portions of the flights to provide front and rear marginal edges which will occupy planes that are normal to the front and rear walls of the casing leg sections. These modified conoidal flights, therefore, will be capable of moving through curved casing portions without materially varying the clearances allowed between the front and rear edges of the flights and their cooperating front and rear casing leg walls.

Figs. 13 to 16 inclusive disclose the warped half and full conoidal flights. An assembly of these flights will include any desired number of right hand half flights 95, any desired number of left hand half flights 96, and any desired number of full flights 97.

Figures 15, 16:
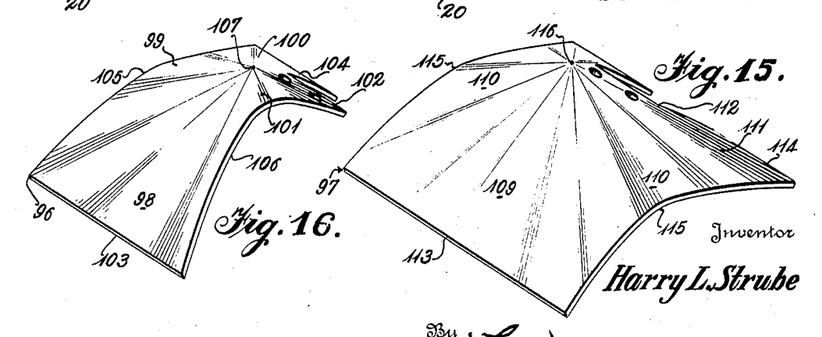
Figure 15 is a detail perspective view of one of the forms of flights shown in Figs. 13 and 14.
Figure 16 is a detail perspective view of the second form of flight shown in Figs. 13 and 14.

The several half flights will be described in detail in connection with Fig. 16. Each one of these half flights is formed with a front surface area 98, a side surface area 99, a rear surface area 100, and a partial side surface area 101. The rear surface area is notched or cut away at 102 to accommodate the associated portion of a transmission chain link. The front and rear surface areas 99 and 100 are provided with marginal edges 103 and 104 respectively which occupy a common plane that is normal to at least the front and rear walls 22 and 21 of the casing leg 20. The side surface area 99 is provided with a curved or upwardly bowed marginal edge 105 while a composite edge 106 forms the other side of each half flight. This composite edge is formed in part by one margin of the front surface area 98, a margin of the rear surface area 100, and the margin of the partial side surface area 101. Although these side marginal edges 105 and 106 are bowed or curved upwardly, they occupy parallel planes which are also parallel to the side casing leg walls 23 and are normal to the front and rear casing leg walls 22 and 21 respectively. These half flights, therefore, are of rectangular formation in plan. The various surface areas 98 to 101 are inclined like the similar surface areas of all of the previously described flights and meet at a vertex 107 which constitutes the most advanced point of each half flight. These vertexes 107 are aligned in the direction of travel of the flights and are coaxial with the axis of the associated casing leg. The vertexes 107, therefore, are spaced from the axis of the transmission chain which is formed by links 25.

These links are provided with attachment lugs 108 to which the flights are rigidly secured. It will be noted by inspecting Figs. 13 and 14 that all portions of these half flights 95 and 96 are located in advance of the axis of articulation of the trailing link joints.

The full flight 97 will be described in detail in connection with Fig. 15. It will be noted that this full flight is formed with a front surface area 109, the two side surface areas 110, and the rear surface area 111. This rear surface area is notched or cut away at 112 to accommodate an associated portion of a chain link. The front and rear surface areas 109 and 111 are respectively provided with marginal edges 113 and 114. These marginal edges occupy a common plane which is normal to the front and rear casing leg walls 22 and 21. The side surface areas 110 are provided with upwardly arched or curved marginal edges 115. These curved marginal edges occupy parallel planes which are additionally arranged in parallelism with the side casing leg walls 23. For that reason, each full flight 97 is of square formation in plan. The various surface areas 109, 110 and 111 are inclined and meet at a vertex 116. The vertexes of all of the full flights 97 are axially aligned with the vertexes 107 of the half flights 95 and 96.

In view of the detailed description given above, it is believed to be unnecessary to discuss to any extent the modes of operation of the several different types of flights. It is believed to be desirable, however, to emphasize certain desirable characteristics.

Because all of the marginal edges of all of the flights which are susceptible of engaging the inner surfaces of casing leg walls are located at the bases of inclined surface areas, the several flights will be able to freely move through vertical, horizontal or inclined casing legs, and around bends or curves, without producing undue noise as a result of chattering or jumping. The locating of all portions of all flights in advance of the trailing joint axes of the respective flights with the trailing marginal edge portions located adjacent the axes of said joints, also, plays an important part in allowing the flights to freely travel through casing legs regardless of their direction or arrangement and without producing undue noise.

Due to the fact that all adjacent flights are formed with interior and exterior surfaces, or are of hollow construction, the flights are capable of cooperating with each other, while passing through succeeding curved and straight casing portions, or when a reasonable amount of overloading of material into the intervening spaces occurs, to take care of the resultant expansion and wedging or squeezing actions on the material occupying the spaces without developing excessive side pressure against the casing walls. The adjacent flights apparently possess the ability to absorb side pressure particularly when the material is being wedged or squeezed therebetween.

Due to the fact that each adjacent pair of right and left hand half flights and each individual full flight offers a symmetrical surface for the movement of material through a conveyer casing, the flights are capable of moving material through vertical or steeply inclined casing legs without developing excessive or uneven side pressure against the casing walls as a result of settling and packing of the conveyed material. In other words, with each adjacent pair of right and left hand half flights and with each individual full flight we have opposed front and rear surface areas and opposed side surface areas which balance each other and equally distribute the application of force to the transported material. It is impossible, therefore, for the flights to develop excessive side pressure on any one or more of the casing leg walls. This symmetrical arrangement of the surface areas of the several flights also automatically functions to maintain the material transporting mechanism centered in the casing leg while moving material therethrough. As no unbalanced pressure is applied to the material by the flights, no appreciable amount of transverse or lateral drift will be developed. Because of that fact, the desired amount of clearance will be maintained between the outer marginal edges of all of the flights and the cooperating casing leg walls.

It is to be understood that the forms of this invention herewith shown and described are to be taken as preferred and additional examples of the same, and that various changes in the shape, size, and arrangement of parts may be resorted to without departing from the spirit of the invention or the scope of the subjoined claims.

Having thus described the invention, I claim:

1. In a conveyer, or the like, for transporting flowable solid materials in bulk, a transmission chain, and a plurality of flights spaced along said chain and individually attached to the links to project from only one side thereof, all of said flights being shaped to provide exterior material moving surfaces having vertexes which are aligned in the direction of travel of the flights and are spaced from the axis of the transmission member, each one of said flights having four angularly arranged outer marginal edges which are separated from their vertex by inclined surface areas.

2. In a conveyer, or the like, for transporting flowable solid materials in bulk, a transmission chain having a plurality of articulated links, and a plurality of flights rigidly attached to said links, each of said flights being shaped to provide an exterior material moving surface having all portions of the same inclined to the same degree with respect to the direction of travel and angularly arranged with respect to each other so as to be capable of spilling material in four radial directions relative to the transmission chain.

3. In a conveyer, or the like, for transporting flowable solid materials in bulk, the combination with a vertical casing leg having four angularly arranged side walls, of a transmission chain having a plurality of articulated links adapted to travel through the casing leg, and a plurality of flights rigidly attached to said links, each of said flights being shaped to provide an exterior material moving surface having four angularly arranged portions inclined to their direction of travel so as to be capable of spilling material rearwardly in four radial directions relative to the transmission chain, each of said exterior flight surfaces terminating in four outer marginal edge portions which are angularly arranged with respect to each other and which are positioned in advance of the axis of articulation of the trailing end of their respective chain link.

4. In a conveyer, or the like, for transporting flowable solid materials in bulk, the combination with a casing leg having four angularly arranged side walls, of a flexible transmission member adapted to travel through said casing leg, and a plurality of flights spaced along said member and attached thereto, each of said flights being shaped to provide an exterior material moving surface having portions which slope toward all of said side walls from a vertex which is located approximately at the axis of the casing leg.

5. In a conveyer, or the like, for transporting flowable solid materials in bulk, the combination with a casing leg having four angularly arranged side walls, of a flexible transmission member adapted to travel through said casing leg, and a plurality of flights spaced along said member and attached thereto, each of said flights being shaped to provide an exterior material moving surface having portions which slope toward all of said side walls from a vertex which is located approximately at the axis of the casing leg and is spaced radially of the path of travel of the transmission member.

6. In a conveyer, or the like, for transporting flowable solid materials in bulk, the combination with a casing leg having four angularly arranged side walls, of a flexible transmission member adapted to travel through said casing leg, and a plurality of flights spaced along said member and attached thereto, each of said flights being shaped to provide an exterior material moving surface having portions which slope toward all of said side walls from a vertex and terminate in outer marginal edges which occupy planes that are parallel to their adjacent side walls.

7. In a conveyer, or the like, for transporting flowable solid materials in bulk, the combination with a casing leg having four angularly arranged side walls, of a flexible transmission member adapted to travel a path adjacent one of said walls, and a plurality of flights spaced along said member and attached thereto to project away from said one wall, each of said flights being shaped to provide an exterior material moving surface having flat portions equal in number to said side walls and each one of which is inclined with respect to the direction of travel of the transmission member and also with respect to a different one of said side walls.

8. In a conveyer, or the like, for transporting flowable solid materials in bulk, the combination with a casing leg having four angularly arranged side walls, of a transmission chain adapted to travel through said casing leg and including a plurality of articulated links, and a plurality of flights rigidly attached to said links, each of said flights being shaped to provide an exterior material moving surface having portions which slope toward all of said side walls from a vertex which is located approximately at the axis of the casing leg.

9. In a conveyer, or the like, for transporting flowable solid materials in bulk, the combination with a casing leg having four angularly arranged side walls, of a transmission chain having a plurality of articulated links adapted to travel through said casing leg, and a plurality of flights rigidly attached to the respective links of said chain, each of said flights being shaped to provide an exterior material moving surface having portions which slope toward all of said side walls from a vertex which is located approximately at the axis of the casing leg and is spaced radially of the path of travel of the transmission chain.

10. In a conveyer, or the like, for transporting flowable solid materials in bulk, the combination with a casing leg having four angularly arranged side walls, of a transmission chain composed of a plurality of articulated links adapted to travel through said casing leg, and a plurality of flights spaced along said chain and rigidly attached to its links, each of said flights being shaped to provide an exterior material moving surface having portions which slope toward all of said side walls from a vertex and terminate in outer marginal edges which occupy planes that are parallel to their adjacent side walls.

11. In a conveyer, or the like, for transporting flowable solid materials in bulk, the combination with a casing leg having four angularly arranged side walls, of a transmission chain composed of articulated links adapted to travel a path adjacent one of said walls, and a plurality of flights spaced along said chain and rigidly attached to the links thereof to project away from said one wall, each of said flights being shaped to provide an exterior material moving surface having four angularly arranged surface areas which are inclined to the same degree with respect to the direction of travel of the transmission chain.

12. In a conveyer, or the like, for transporting flowable solid materials in bulk, the combination with a vertical casing leg of angular formation in horizontal section opening at its upper end into a discharge chamber of a casing head section, and a flexible transmission member adapted to travel a path adjacent one wall of said casing leg and to move into said discharge chamber through the opening at the upper end of the casing leg, of a series of flights spaced along said transmission member and attached thereto to project away from the casing leg wall traversed by said transmission member, each of said flights being shaped to provide an exterior material moving surface having a vertex which is spaced from the casing wall traversed by said transmission member and is entirely surrounded by declining surface areas that terminate in angularly arranged outer marginal edges, said declining surface areas being adapted to spill material in four general directions as the flights pass into said discharge chamber.

13. In a conveyer, or the like, for transporting flowable solid materials in bulk, the combination with a vertical casing leg of rectangular cross section, of a transmission chain adapted to travel through said leg adjacent one wall thereof, and a series of flights spaced along said chain and attached individually to the links thereof to project from said one casing wall, each one of said flights being constructed to provide an exterior surface which is employed to move the material and is of pyramidal form.

14. In a conveyer, or the like, for transporting flowable solid materials in bulk, the combination with a vertical casing leg of rectangular cross section, of a transmission chain adapted to travel through said leg adjacent one wall thereof, and a series of flights spaced along said chain and attached individually to the links thereof to project from said one casing wall, each one of said flights being constructed to provide an exterior surface which is employed for moving the material and is of conoidal form.

HARRY LOUIS STRUBE.